United States Patent
Badin et al.

(10) Patent No.: US 6,632,492 B1
(45) Date of Patent: Oct. 14, 2003

(54) PROCESS AND DEVICE FOR SHAPING HOLLOW GLASS OBJECT

(75) Inventors: Rémy Badin, Criel (FR); Lucien Fosse, Etalondes (FR)

(73) Assignee: Saint-Gobain Emballage, Courbevoie (FR)

( * ) Notice: Subject to any disclaimer, the term of this patent is extended or adjusted under 35 U.S.C. 154(b) by 0 days.

(21) Appl. No.: 09/534,972

(22) Filed: Mar. 27, 2000

(30) Foreign Application Priority Data

Mar. 25, 1999 (FR) .............................. 99 03718

(51) Int. Cl.$^7$ .............. B29D 22/00; B29D 23/00; B32B 1/08
(52) U.S. Cl. ............ 428/34.4; 428/34.1; 428/34.5; 215/42; 215/371; D09/545; D09/522; D09/537
(58) Field of Search ............... 428/34.1, 34.4, 428/34.5; 215/42, 371; D09/545, 574, 579, 576, 522, 537

(56) References Cited

U.S. PATENT DOCUMENTS

| | | | | |
|---|---|---|---|---|
| D29,092 S | * | 7/1898 | Freeman | D9/558 |
| D54,684 S | * | 3/1920 | Rudd | D9/544 |
| D212,525 S | * | 10/1968 | Kneapler | D9/519 |
| 3,734,703 A | | 5/1973 | Hollingsworth | |
| 3,776,711 A | | 12/1973 | Hollingsworth | |
| 4,013,437 A | * | 3/1977 | Northup | 65/233 |
| 6,233,973 B1 | * | 5/2001 | Monchatre | 65/105 |

FOREIGN PATENT DOCUMENTS

WO    WO 99/42411    8/1999

* cited by examiner

*Primary Examiner*—Kenneth R. Rice
(74) *Attorney, Agent, or Firm*—Oblon, Spivak, McClelland, Maier & Neustadt, P.C.

(57) ABSTRACT

A process of shaping a hollow glass object, including the steps of roughing out molten glass into a rough mold with a collar and a shoulder, transferring the rough mold prepared in the roughing out step to a finishing mold, and partially driving the collar into the shoulder while maintaining at least one part of a height of the collar.

2 Claims, 3 Drawing Sheets

PROCESS AND DEVICE FOR SHAPING HOLLOW GLASS OBJECT

CROSS-REFERENCE TO RELATED APPLICATION

The present application claims priority under 35 U.S.C. §119 to French Patent Application No. 99/03718, filed Mar. 25, 1999, entitled "Process and Device for Shaping of Hollow Glass Objects and the Resulting Objects." The contents of that application are incorporated herein by reference in their entirety.

BACKGROUND OF THE INVENTION

1. Field of the Invention

The present invention pertains to a shaping process of a hollow object made of glass such as a bottle, a flask, a jar, etc., and a device for implementing such a process.

2. Description of the Background

The traditional processes, which are presently extensively used to make flasks, employ so-called individual section machines and are known under the names of the "blown-blown" and "press-blown" processes.

These processes can be broken down into several stages. In the following, the "blown-blown" process, which is the most widely used of the two, is described.

The conventional "blow-blow" process includes the steps of:

loading: a drop or ball of glass enters due to the effect of its own weight into a first mold (a roughing mold) through its upper end which corresponds to the bottom of a final product such as a bottle, etc.;

compression: after loading, a rough bottom section closes the roughing mold; then a blast of compressed air forces the drop of glass in the roughing mold through the intermediary of the roughing mold into the lower part of the mold in which a collar of the final product is later formed; this compression also ensures good thermal contact between the drop of glass and the roughing mold;

perforation: a punch of small dimensions, taking up approximately the height of the collar and fitted at the lower part of the roughing mold, detaches from the lower part of the roughing mold, thereby leaving room for compressed air to be delivered, the compressed air pushes in front of it the hot, less viscous glass located in the vicinity of the axis of the roughing mold, while the more viscous cold glass that has been cooled upon contact with the mold remains in place; a blank or a rough mold of the final product is thereby produced;

transfer: when the blank is sufficiently cooled in the roughing mold for handling, the blank is transferred into a second mold (a finishing mold) which has a shape of the final product;

elongation and blowing: once the blank is placed in the finishing mold, the blank is allowed to lengthen for a certain amount of time before blowing in order to give the shape of the product; this lengthening stage allows the glass to be distributed throughout the product;

extraction: upon contact with the finishing mold, the glass cools quickly, and when its viscosity is sufficiently low, the product is extracted from the finishing mold.

Such a process allows one to make flasks in a large number of shapes, whether they are axisymmetrical or not. The flasks can be classified in a non-limiting manner into two categories, particularly depending upon the type of liquid which they contain: those in which the collar includes a fillet and which are closed by a plug; and those in which the collar does not have a fillet and which are provided with an atomizer set at the top of the collar and enclosed by a cap.

Recently, certain perfume makers have requested that a new flask shape belonging to the second category mentioned above be made.

This means making a flask with the following characteristics: the outer casing, that is, the part made of glass extended by the envelope of the cap, must be included in a sphere of a certain diameter; and the collar must have a large opening, that is, it must have a considerable diameter with respect to that of the sphere.

Such a flask, and especially the part made of glass, cannot be produced in the traditional manner, because, as already stated, the atomizer, which must be set around the collar, necessarily has large dimensions and thus the cap in the shape of a spherical cover cannot be included in the extension of the spherical part of the glass body.

To overcome these problems, a shaping process of a hollow object made of glass provided with a collar and a shoulder according to the present invention, employing a "blown-blown" technique, includes a roughing-out phase, a transfer phase and a finishing phase, wherein during the finishing phase, the collar is partially driven into the shoulder while maintaining at least one part of the height of the collar.

Such a process according to the present invention provides an excellent answer to the problems presented above while avoiding any risk of making the glass more fragile once it has solidified.

However, this solution, while surprisingly simple, is far from obvious. To obtain controlled deformation of the desired area without thereby deforming the collar is difficult, especially due to the highly constraining tolerances with respect to the diameter of the collar.

Preferably, the driving-in stage is performed immediately after the air blasting stage which brings the glass into contact with the finishing mold, thereby benefitting from optimal viscosity of the glass in order to easily deform the glass in a highly controlled manner.

An advantageous characteristic according to the present invention is that because only the shoulder of the object is withdrawn from the mold prior to the driving-in stage, the mass of the glass necessary for making the body is left well-distributed throughout the finishing mold.

Another advantageous characteristic according to the present invention is that, immediately after the collar is driven into the shoulder, the object is blown inside. This additional blowing allows good evacuation of heat while having very little effect on the distribution of the glass inside the mold.

The present invention also pertains to a particularly appropriate device for implementing the process in accordance with the present invention.

According to the present invention, a shaping device of a hollow object made of glass provided with a collar and a shoulder includes a mold having two main shells combined with one another along a vertical axis and a blasting head connected to a circuit, wherein the blasting head includes a support structure in which a translationally movable part is installed and whose terminal part is designed to hold the collar of the hollow object.

A preferred characteristic according to the present invention includes the terminal part of the movable piece which has an internal diameter approximately equal to the external diameter of the collar of the object.

Such a shape allows one to hold the interior of the collar, thereby avoiding the risk of marking the exterior of the collar and harming the object's appearance.

An additional characteristic according to the present invention includes the terminal part of the movable piece which has an external shape that approximates a truncated cone.

Advantageously, the movement of the movable piece in the support structure is ensured by a pneumatic device. This allows one to control in a very precise manner the direction of the piece and monitor the precision of the driving-in action in conformity with the invention.

A device according to the present invention is particularly well-suited for use as a finishing mold of an individual section machine.

The invention also pertains to a hollow object made of glass, which is produced in conformity with the previously described process or by means of the aforementioned device.

This object is characterized by an "undercut" formed therein.

"Undercut" mean, within the scope of the invention, a shoulder line which joins the culminating point of the body at the lowest point of the collar, and is located below the horizontal when the collar is directed upward and its axis is extending along the vertical.

SUMMARY OF THE INVENTION

An object of the present invention is to provide a novel process of shaping a hollow glass object, which allows to manufacture a hollow glass object whose glass body and cap are included in a sphere of a certain diameter while the collar of the hollow glass object is provided with a large opening.

Another object of the present invention is to provide a novel device for implementing the process described above.

The first object may be accomplished by a process of shaping a hollow glass object, including the steps of roughing out molten glass into a rough mold with a collar and a shoulder, transferring the rough mold prepared in said roughing out step to a finishing mold, and partially driving the collar into the shoulder while maintaining at least one part of a height of the collar.

The second object may be accomplished by a device for shaping a hollow glass object with a collar and a shoulder, including a mold including at least two main shells combined with one another along a vertical axis, and a blasting head configured to blast at least one of air and gas. The blasting head includes a movable piece having a terminal part configured to hold the collar.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE PREFERRED EMBODIMENTS

Figure 1:
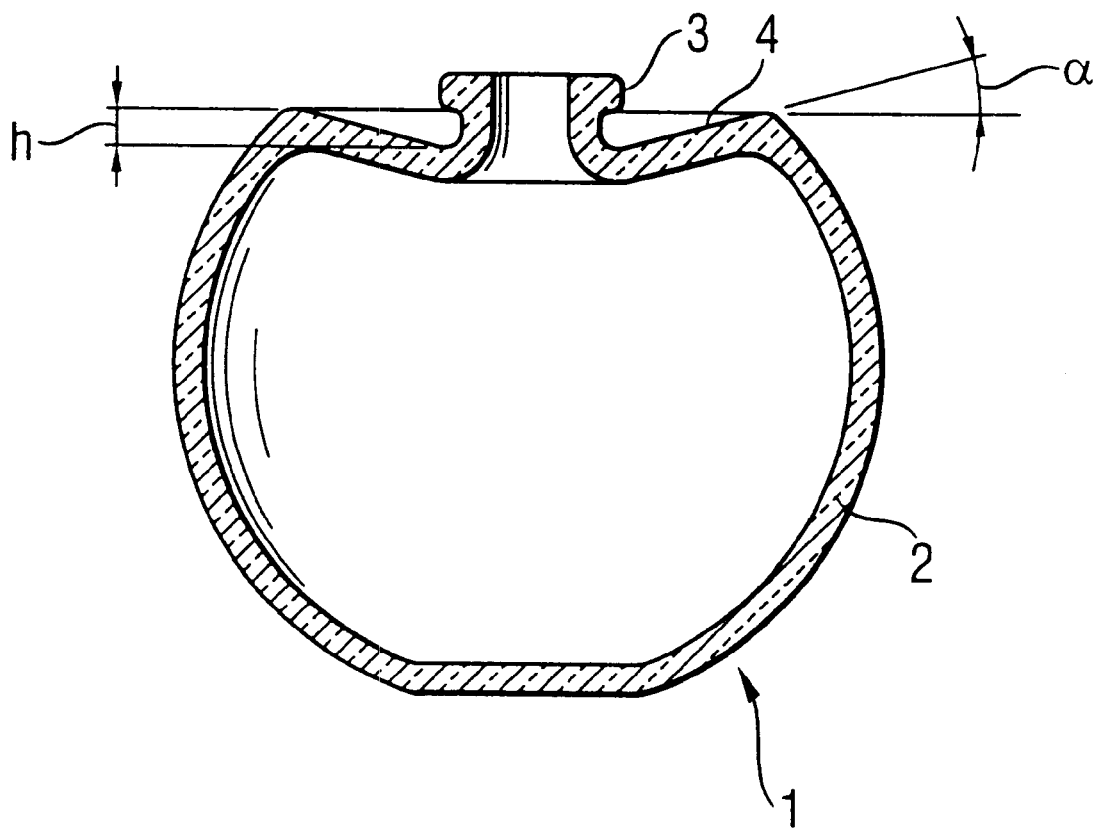
FIG. 1 is a cross-sectional side view of a flask obtained in conformity with the process according to the present invention.

The preferred embodiments will now be described with reference to the accompanying drawings, wherein like reference numerals designate corresponding or identical elements throughout the various drawings.

FIG. 1 shows a body 2 and a collar 3 of a flask 1. In FIG. 1, the collar 3 is subsided into a shoulder 4 so that the flask I has an undercut. This undercut is such that the shoulder line makes an angle ($\alpha$) of approximately 5° with respect to the horizontal. The bottom of the collar 3 is sunk by a height (h) of approximately 5 mm with respect to the culminating point of the body 2 of the flask 1.

In producing the flask 1, the blank is held by the collar mold, and transferred to the finishing mold of an individual section machine in a conventional manner.

Next, two sliding plates 5, 6 arrive on both sides of the neck 7 and begin to squeeze the blank at the level of the neck 7. Then, through the intermediary of a blasting head not shown, blasting that brings the glass into contact with the finishing mold is carried out.

Figure 2:
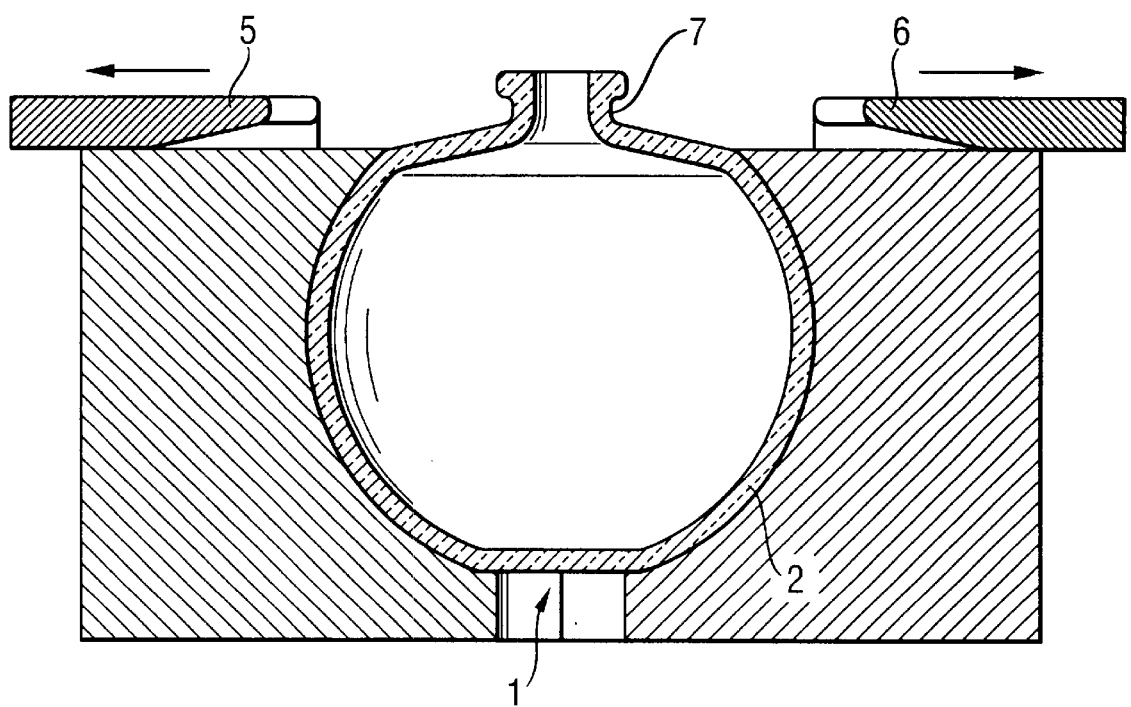
FIG. 2 is a cross-sectional view showing a flask in the first of two stages in the process according to the present invention implemented in a finishing mold of an individual section machine.

After a very short period of time, the sliding plates 5, 6 separate from neck 7 as shown in FIG. 2. In other words, the movement of the plates is such that the removal from the mold is achieved only at the level of its shoulder.

Once the plates 5, 6 have been removed, the collar 3 is driven-in into the shoulder 4 by means of a piece 8 which is a movable part of the blasting head not shown.

Figure 3:
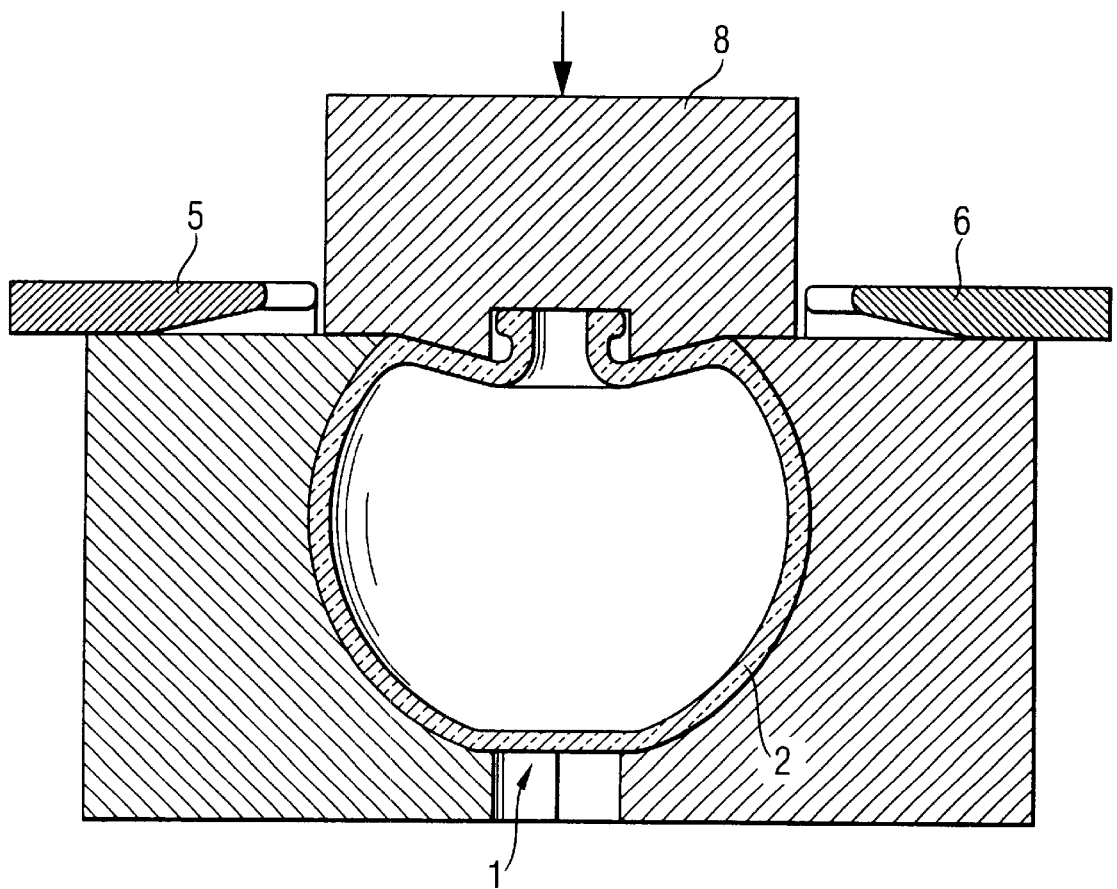
FIG. 3 is a cross-sectional view showing a flask in the second of the two stages described above.

In the driving-in stage shown in FIG. 3, the structure of the piece 8 is designed so as to hold the collar 3.

As stated previously, such a structure allows one to obtain the desired deformation within the scope of the present invention without deforming the collar 3.

When the piece 8 is in a low position, additional blasting is carried out for the purpose of causing the temperature of the glass to decline and therefore to harden the glass.

Once the driving-in has been completed, the flask 1 is removed from the mold in conformity with the present invention along the plane of the joint of the finishing mold.

Of course, many modifications can be introduced without departing from the scope of the present invention. For example, the metal used to make the plates 5, 6 could be improved in such a manner as to obtain minimal adhesion of the plates 5, 6 with the glass.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A hollow glass object comprising:
   a substantially spherical hollow glass body having a culminating point and including a shoulder portion extending from said culminating point; and
   a collar connected to said substantially spherical hollow glass body via said shoulder portion and substantially sunken into said substantially spherical hollow glass body with respect to said culminating point of said substantially spherical hollow glass body, the collar being so dimensioned as to be able to accommodate an atomizer thereon and a cover which covers the atomizer therein, the cover being an extension of a sphere defined by the substantially spherical hollow glass body.

2. The hollow glasss object of claim 1, wherein said collar has a neck portion, and said neck portion is sunken into said substantially spherical hollow glass body so as to be lower than said culminating point.

* * * * *

UNITED STATES PATENT AND TRADEMARK OFFICE
CERTIFICATE OF CORRECTION

PATENT NO. : 6,632,492 B1 Page 1 of 1
DATED : October 14, 2003
INVENTOR(S) : Badin et al.

It is certified that error appears in the above-identified patent and that said Letters Patent is hereby corrected as shown below:

<u>Title page,</u>
Item [30], Foreign Application Priority Data, should read:
-- [30]    Foreign Application Priority Data
       Mar. 25, 1999   (FR) ........................... 99 03719 --

Signed and Sealed this

Twentieth Day of January, 2004

JON W. DUDAS
*Acting Director of the United States Patent and Trademark Office*